(12) United States Patent
Weiss et al.

(10) Patent No.: US 9,678,945 B2
(45) Date of Patent: Jun. 13, 2017

(54) AUTOMATED READING COMPREHENSION

(71) Applicant: Google Inc., Mountain View, CA (US)

(72) Inventors: Tania Bedrax Weiss, Sunnyvale, CA (US); Anna Patterson, Saratoga, CA (US); Charmaine Cynthia Rose D'Silva, Sunnyvale, CA (US); Advay Mengle, Sunnyvale, CA (US); Md Sabbir Yousuf Sanny, Sunnyvale, CA (US); Luke Friedman, San Francisco, CA (US); Daniel Andersson, Mountain View, CA (US); Louis Shao, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/709,406

(22) Filed: May 11, 2015

(65) Prior Publication Data
US 2015/0324349 A1 Nov. 12, 2015

Related U.S. Application Data

(60) Provisional application No. 61/992,126, filed on May 12, 2014, provisional application No. 61/992,117, filed on May 12, 2014.

(51) Int. Cl.
*G06F 17/27* (2006.01)
*G06F 17/30* (2006.01)

(52) U.S. Cl.
CPC .... *G06F 17/2765* (2013.01); *G06F 17/30654* (2013.01); *G06F 17/30684* (2013.01); *G06F 17/30864* (2013.01)

(58) Field of Classification Search
CPC .................................................. G06F 17/2765
See application file for complete search history.

(56) References Cited

U.S. PATENT DOCUMENTS

| | | | |
|---|---|---|---|
| 6,199,034 B1 * | 3/2001 | Wical | G06F 17/2785 704/9 |
| 7,689,557 B2 | 3/2010 | Pandit et al. | |
| 8,032,827 B2 | 10/2011 | Melander et al. | |
| 8,484,201 B2 | 7/2013 | Li et al. | |
| 8,594,996 B2 | 11/2013 | Liang et al. | |
| 8,805,823 B2 | 8/2014 | Nitz | |
| 2005/0216443 A1 * | 9/2005 | Morton | G06F 17/3002 |
| 2006/0253418 A1 | 11/2006 | Charnock et al. | |
| 2007/0073533 A1 | 3/2007 | Thione et al. | |
| 2008/0301279 A1 * | 12/2008 | Brey | G06F 11/30 709/224 |
| 2009/0222395 A1 | 9/2009 | Light et al. | |

(Continued)

OTHER PUBLICATIONS

International Search Report and Written Opinion of PCT Serial No. PCT/US15/030236 Oct. 8, 2015.

(Continued)

*Primary Examiner* — Ibrahim Siddo
(74) *Attorney, Agent, or Firm* — Middleton Reutlinger

(57) ABSTRACT

Methods and apparatus are disclosed for determining similarities and/or differences between entities in a segment of text based on various signals are presented, and for determining one or more likelihoods that one or more subjects found in a segment of text are capable of performing one or more associated actions based on various signals.

20 Claims, 7 Drawing Sheets

(56) References Cited

U.S. PATENT DOCUMENTS

| | | | | |
|---|---|---|---|---|
| 2011/0106807 A1* | 5/2011 | Srihari | ............. | G06F 17/30604 707/739 |
| 2011/0295594 A1 | 12/2011 | Cai et al. | | |
| 2013/0054598 A1* | 2/2013 | Caceres | ............ | G06F 17/30303 707/737 |
| 2013/0103386 A1* | 4/2013 | Zhang | ................ | G06F 17/2785 704/9 |
| 2013/0226846 A1* | 8/2013 | Li | ........................... | G06N 5/02 706/12 |

OTHER PUBLICATIONS

Peterson, Sarah E., and Mari Ostendorf. "A Machine Learning Approach to Reading Level Assessment." University of Washington CSE Technical Report (2006). ftp://ftp.cs.washington.edu/tr/2006/06/UW-CSE-06-06-06.pdf Jun. 15, 2006.

Mani, Inderjeet, and Eric Bloedorn. "Machine Learning of Generic and User-Focused Summarization." arXiv preprint cs/9811006. http://citeseerx.ist.psu.edu/viewdoc/download?doi=10.1.1.342.4323&rep=rep1&type=pdf Nov. 2, 1998.

\* cited by examiner

BOB AND TOM ARE BOTH MALE. BY CONTRAST, MARY IS NOT. BOB HAS GRAY HAIR, TOM DOES NOT. MARY HAS BLOND HAIR, NO CAR AND A CONDO. TOM HAS A BUICK AND LIVES IN A HOUSE. BOB LIVES WITH TOM AND ESCHEWS A CAR FOR PUBLIC TRANSPORTATION.

450

1. WHICH OF THE FOLLOWING CHOICES ABOUT BOB AND TOM IS TRUE? 444

A) BOB AND TOM BOTH HAVE GRAY HAIR  446a
B) BOB LIVES IN A CONDO, TOM DOES NOT  446b
C) BOB AND TOM PREFER PUBLIC TRANSPORTATION  446c
D) BOB LIVES IN A HOUSE AND TOM DOES NOT HAVE GRAY HAIR  446d

Fig. 4

AUTOMATED READING COMPREHENSION

BACKGROUND

Search engines provide information about documents such as web pages, images, text documents, emails, and/or multimedia content. A search engine may identify the documents in response to a user's search query that includes one or more search terms. The search engine may rank the documents based on the relevance of the documents to the query and the importance of the documents, and may provide search results that include aspects of and/or links to the identified documents. In some cases, search engines may additionally or alternatively provide information that is responsive to the search query yet unrelated to any particular document (e.g., "local time in Tokyo"). Search engines may extract various types of information directly from documents, e.g., to make documents "findable" by searching for the extracted information. Information extracted directly from documents may include named entities (e.g., people, places, things, etc.), attributes of named entities, temporal data (dates, times, time intervals, etc.), actions performed by subjects, and so forth.

SUMMARY

This specification is directed generally to methods and apparatus for determining similarities and/or differences between entities described in segments of text, and/or to determining whether an action associated with a subject in a segment of text is likely performable by the subject. A segment of text such as an excerpt of a story, an article, an email, a text message, a book (or a chapter or smaller portion thereof), an essay, and so forth may be analyzed, e.g., using various techniques such as regular expressions, rules, machine learning, co-reference resolution, etc., to identify one or more entities (e.g., persons, places, things, etc.) and/or one or more subjects (e.g., persons, animals, characters, beings, etc.) referred to in the segment of text.

In some implementations, one or more entity attributes associated with the identified one or more entities may be identified, e.g., using similar techniques. Based on the identified entity attributes, as well as other signals (e.g., compare/contrast signals contained in the segment of text, synonyms/antonyms of the entity attributes), one or more determinations about similarities and/or differences between entities may be made. Determinations about entity attributes may be used for various purposes, such as providing more robust information about segments of text (e.g., to enhance search engine searching), answering questions about documents (e.g., to aid in automated reading comprehension test taking, or to assist in providing informational query results), and so forth.

Additionally or alternatively, one or more actions associated with the identified one or more subjects may also be identified. Based at least in part on reference subjects and associated reference actions found in a corpus of documents, a likelihood that the action is performable by the subject may be determined. For example, assume the subject is an animal and the associated action is one that is typically performed by a human (e.g., singing, dancing). Reference subjects and actions contained in a corpus of non-fictional news stories may be analyzed to determine a likelihood that the animal subject would be able to perform the action. If the action is deemed to be unlikely performable by the animal subject, an indication may be provided that the animal subject has been "personified." Indications of likelihood that a subject would be capable of performing an associated action may be used for various purposes, such as providing more robust information about segments of text (e.g., to enhance search engine searching), answering questions about documents (e.g., to aid in automated reading comprehension test taking, or to assist in providing informational query results), and so forth.

In some implementations, a computer implemented method may be provided that includes the steps of: identifying, by a computing system based at least in part on a segment of text, a first entity and a second entity; identifying, by the computing system based at least in part on the segment of text, a first entity attribute of the first entity and a second entity attribute of the second entity that share an attribute class; and providing, by the computing system, an indication that, in the segment of text, the first entity attribute is either similar to or different than the second entity attribute.

This method and other implementations of technology disclosed herein may each optionally include one or more of the following features.

In some implementations, the method may further include generating, by the computing system based on an answer choice that directly describes a relationship between the first entity and the first entity attribute and indirectly describes a relationship between the second entity and the second entity attribute, a textual rewrite that directly describes a relationship between the second entity and the second entity attribute. In some implementations, the method may further include comparing the textual rewrite to textual rewrites generated based on the segment of text to determine a veracity of the answer choice.

In some implementations, identifying the first and second entities may be based on a question posed about the segment of text. In some implementations, the method further includes opting to provide either the indication that the first entity attribute is similar to the second entity attribute or different than the second entity attribute based on a type of question posed about the segment of text.

In some implementations, the method may further include opting to provide either the indication that the first entity attribute is similar to the second entity attribute or different than the second entity attribute based on one or more compare or contrast signals contained in a question posed about the segment of text. In some implementations, identifying the second entity attribute of the second entity may include determining the second entity attribute of the second entity based on a portion of the segment of text that directly describes a relationship between the first entity and the first entity attribute and indirectly describes a relationship between the second entity and the second entity attribute.

In some implementations, the method may further include generating a textual rewrite that directly describes a relationship between the second entity and the second entity attribute. In implementations, providing the indication that the first entity attribute is either similar to or different than the second entity attribute may include providing the textual rewrite.

In some implementations, identifying the first entity attribute of the first entity may include identifying a pronoun associated with the first entity attribute and co-reference resolving the first entity with the pronoun. In some implementations, providing the indication that the first entity attribute is either similar to or different than the second entity may be based on one or more words that signify a comparison or contrast to be made between two components.

In some implementations, providing the indication that the first entity attribute is either similar to or different than the second entity attribute may include providing an indication that the first entity is similar to or different than the second entity based on a similarity or difference, respectively, between the first entity attribute and the second entity attribute.

In some implementations, the method may further include: receiving a question that includes information, the information including the first entity and the second entity; and matching the information to the first entity and the second entity. In some implementations, providing the indication that the first entity attribute is either similar to or different than the second entity attribute may be in response to the matching. In some implementations, the first and second entities are first and second products, the first and second entity attributes are first and second product attributes, and the method further comprises providing a summary of product features of the first and second products, the summary including an indication of the first and second product features.

In another aspect, a computer implemented method may be provided that includes the steps of: identifying, in a segment of text by a computing system, a subject and an action performed by the subject; determining, by the computing system, a likelihood that the action is performable by the subject, the likelihood based at least in part on a plurality of reference subjects and associated reference actions found in a corpus of textual documents; and providing, by the computing system, an indication of the likelihood.

This method and other implementations of technology disclosed herein may each optionally include one or more of the following features.

In various implementations, the providing may include providing an indication that performance of the action by the subject is plausible or implausible based on the likelihood. In various implementations, the subject may be a non-human subject, and the providing may include providing an indication that the subject has been personified in the segment of text. In various implementations, the identifying may include identifying the subject and action based at least in part on annotations associated with the segment of text.

In various implementations, the method may further include determining the likelihood based at least in part on a class annotation associated with the subject. In some implementations, the likelihood may be a likelihood that the action is performable by members of a class associated with the class annotation. In various implementations, the method may further include identifying the class based on the class annotation associated with the subject and determining the likelihood based at least in part on the class.

In various implementations, determining the likelihood may be based on a question posed about the segment of text. In various implementations, the method may further include determining the likelihood based at least in part on statistics derived from the plurality of reference subjects and associated reference actions found in the corpus of textual documents. In various implementations, determining the likelihood based at least in part on the plurality of reference subjects and associated reference actions found in the corpus of textual documents may include restricting the corpus to textual documents that contain below a predetermined threshold of personified entities.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 illustrates an example of how disclosed techniques may be utilized to solve reading comprehension exam questions.

DETAILED DESCRIPTION

Figure 1:
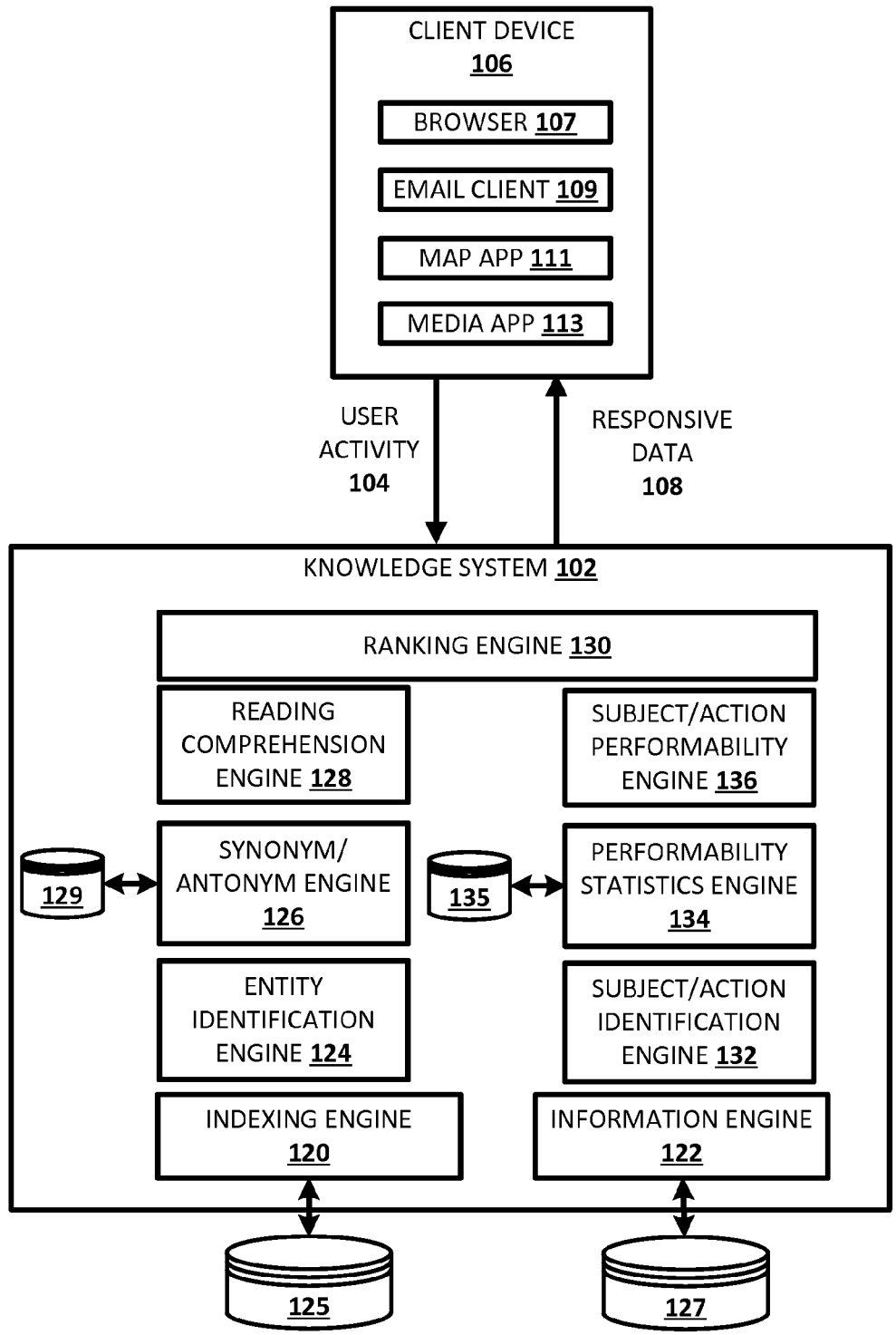
FIG. 1 illustrates an example environment in which similarities and/or differences between entities in segments of text may be determined, and/or in which segments of text may be analyzed to determine likelihoods that actions are performable by associated subjects.

FIG. 1 illustrates an example environment in which one or more similarities and/or differences between entities contained in one or more segments of text may be determined, and in which a segment of text may be analyzed to determine a likelihood that an action is performable by an associated subject (also referred to as "subject-action performability"). The example environment includes a client device 106 and a knowledge system 102. Knowledge system 102 may be implemented in one or more computers that communicate, for example, through a network (not depicted). Knowledge system 102 is an example of an information retrieval system in which the systems, components, and techniques described herein may be implemented and/or with which systems, components, and techniques described herein may interface.

A user may interact with knowledge system 102 via client device 106 and/or other computing systems (not shown). Client device 106 may be a computer coupled to the knowledge system 102 through a network such as a local area network (LAN) or wide area network (WAN) such as the Internet. The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided.

Knowledge system 102 may detect activity of the particular user, such as activity 104 by that user on client device 106 or activity by that user on other computing devices (not shown), and provide various responsive data 108 to client device 106 or to other computing devices used by the user (again, not shown). While the user likely will operate a plurality of computing devices, for the sake of brevity, examples described in this disclosure will focus on the user operating client device 106. Client device 106 may execute one or more applications, such as a browser 107, email client 109, map application 111, and/or a media consumption application 113. In some instances, one or more of these applications may be operated on multiple client devices operated by the user.

User activity 104 may include one or more questions about one or more segments of text, one or more search engine queries searching for documents and/or information, data indicative of user consumption of various items (e.g., songs, videos, books, restaurants, etc.), and so forth. As used herein, a "segment of text" may include any sequence of textual characters in any language, including but not limited to a story (or an excerpt thereof), an article, an email, a text message, a book (or a chapter or smaller excerpt thereof), an essay, a poem, advertising copy, and so forth. A segment of text to be analyzed using disclosed techniques may be obtained from various sources, including but not limited to client device 106, knowledge system 102, or elsewhere.

Responsive data 108 may include a wide variety of data and information that may be generated and/or selected based at least in part on entity comparisons/contrasts determined from segments of text using disclosed techniques, and/or on subject-action performability statistics determined using techniques disclosed herein. For example, data 108 may include but is not limited to data directly indicative of entity comparisons/contrasts drawn from segments of text (e.g., an answer to "how are A and B the same"), search results ranked based at least partially on entity comparisons/contrasts, one or more alternative query suggestions or navigational search results, targeted advertising, recommendations for items (e.g., songs, videos, restaurants, etc.) to consume, and so forth. Additionally or alternatively, data 108 may include data directly indicative of subject-action performability, e.g., in response to a direct question. Data 108 may include other information identified, determined, ranked and/or selected based at least in part on subject-action performability, including but not limited to search results, one or more alternative query suggestions or navigational search results, targeted advertising, recommendations for items (e.g., songs, videos, restaurants, etc.) to consume, and so forth.

Client device 106 and knowledge system 102 each include one or more memories for storage of data and software applications, one or more processors for accessing data and executing applications, and other components that facilitate communication over a network. The operations performed by client device 106 and/or knowledge system 102 may be distributed across multiple computer systems. Knowledge system 102 may be implemented as, for example, computer programs running on one or more computers in one or more locations that are coupled to each other through a network.

In various implementations, knowledge system 102 may include an indexing engine 120, an information engine 122, an entity identification engine 124, a synonym/antonym engine 126, a reading comprehension engine 128, a ranking engine 130, a subject/action identification engine 132, a performability statistics engine 134, and/or a subject/action performability engine 136. In some implementations one or more of engines 120, 122, 124, 126, 128, 130, 132, 134, and/or 136 may be omitted. In some implementations all or aspects of one or more of engines 120, 122, 124, 126, 128, 130, 132, 134, and/or 136 may be combined. In some implementations, one or more of engines 120, 122, 124, 126, 128, 130, 132, 134, and/or 136 may be implemented in a component that is separate from knowledge system 102. In some implementations, one or more of engines 120, 122, 124, 126, 128, 130, 132, 134, and/or 136, or any operative portion thereof, may be implemented in a component that is executed by client device 106.

Indexing engine 120 may maintain an index 125 for use by knowledge system 102. Indexing engine 120 may process documents and updates index entries in the index 125, for example, using conventional and/or other indexing techniques. For example, indexing engine 120 may crawl one or more resources such as the World Wide Web and index documents accessed via such crawling. As another example, indexing engine 120 may receive information related to one or documents from one or more resources such as web masters controlling such documents and index the documents based on such information. A document is any data that is associated with a document address. Documents include web pages, word processing documents, portable document format (PDF) documents, images, emails, calendar entries, videos, and web feeds, to name just a few. Each document may include content such as, for example: text, images, videos, sounds, embedded information (e.g., meta information and/or hyperlinks); and/or embedded instructions (e.g., ECMAScript implementations such as JavaScript). Indexing engine 120 may also use information about entities described in documents as part of its indexing. For example, indexing engine 120 may update index entries in index 125 with information, obtained using disclosed techniques, about similarities and/or differences between entities in documents and/or subject-action performabilities.

Information engine 122 may optionally maintain another index 127 that includes or facilitates access to non-document-specific information for use by the knowledge system 102. For example, knowledge system 102 may be configured to return information in response to search queries that appear to seek specific information. If a user searches for "Ronald Reagan's birthday," knowledge system 102 may receive, e.g., from information engine 122, the date, "Feb. 6, 1911." In some implementations, index 127 itself may contain information, or it may link to one or more other sources of information, such as online encyclopedias, almanacs, and so forth. In some implementations, index 127 may be at least partially populated with information, obtained using disclosed techniques, about similarities and/or differences between entities in documents. In some implementations, index 127 may be at least partially populated with information, obtained using disclosed techniques, about subject-action performabilities. In some implementations, index 127 may be at least partially populated with information obtained by analyzing reference subjects and associated reference actions found in corpora of documents.

In various implementations, index 125 or index 127 may include mappings between queries (or query terms) and documents and/or information. In some implementations, index 127 may store a knowledge graph that includes nodes that represent various entities and weighted edges that represent relationships between those entities. Such a knowledge graph may be built, for instance, by crawling a plurality of databases, online encyclopedias, and so forth, to accumulate nodes presenting entities and edges representing relationships between those entities. In some implementations, the knowledge graph may be populated with information, obtained using disclosed techniques, about similarities and/or differences between entities in documents. In some implementations, the knowledge graph may be populated with information, obtained using disclosed techniques, about subject-action perform abilities.

Entity identification engine 124 may be configured to identify two or more entities and associated entity attributes in a segment of text. In some implementations, entity identification engine 124 may utilize annotated output generated by one or more text annotators (see FIG. 2) based on a segment of text to identify two or more entities and associated entity attributes. In some implementations, entity identification engine 124 may additionally or alternatively utilize regular expressions, machine learning, rules-based approaches, heuristics, or other techniques to identify two or more entities in a segment of text.

Various techniques may be utilized to determine which entity attributes to associate with which entities in a segment of text. For example, entity identification engine 124 may utilize co-reference resolution to map a pronoun with a particular entity and, in turn, map an attribute of the pronoun to the given entity. For example, entity identification engine 124 may resolve "they" to "Doug and Maria" and associate "red hair" with "Doug" and with "Maria" based on the following sentences in a segment of text: "Maria and Doug are siblings. They both have red hair."

Object completion is another technique that may be employed by entity identification engine 124 and/or other components described herein, e.g., to associate entity attributes with entities when those attributes are not directly mentioned in relation to the entities. Assume a segment of text contains a sentence or phrase that directly describes a relationship between a first entity and a first entity attribute, but only indirectly describes a relationship between a second entity and a second entity attribute. Entity identification engine 124 may be configured to determine, and in some cases generate a textual rewrite that more directly describes, a relationship between the second entity and the second entity choice. For example, entity identification engine 124 may employ object completion to determine "6" references "legs" in the sentence "Spiders have 8 legs, ants have 6."—and "6 legs" may be associated with the entity, "ants."

Yet another example of a technique to associate attributes with entities is usage of synonyms and/or antonyms of terms from the text. To this end, synonym/antonym engine 126 may build and/or maintain an index 129 of words and/or phrases that may function as entity attributes, as well as synonyms and/or antonyms of those words and/or phrases. In some implementations, synonym/antonym engine 126 may be operated outside of knowledge system 102, e.g., by a third party dictionary and/or thesaurus service. Assume a segment of text contains the sentence, "Spiders have 8 legs." "Limbs" may be identified by synonym/antonym engine 126 as a synonym of "legs." "8 limbs" may then be associated by entity identification engine 124 with the entity associated with "spiders." Also, for example, for the sentence "Bob is tall, Joe is not," "short" may be identified by synonym/ antonym engine 126 as an antonym of "tall," and "short" may be associated, e.g., by entity identification engine 124, with the entity, "Joe."

In this specification, the term "database" and "index" will be used broadly to refer to any collection of data. The data of the database and/or the index does not need to be structured in any particular way and it can be stored on storage devices in one or more geographic locations. Thus, for example, the indices 125, 127, 129 and 135 may include multiple collections of data, each of which may be organized and accessed differently.

Determined associations between entities and attributes may be stored, e.g., by entity identification engine 124, in various manners for utilization in determining similarities/ differences. In some implementations, the associations may be stored, e.g., by entity identification engine 124, as index entries, a table, a graph, etc. In some implementations, the associations may be stored, e.g., by entity identification engine 124, as one or more textual rewrites that are generated from the segment of text. For example, the sentence "Spiders have 8 legs, ants have 6." may be rewritten, e.g., by entity identification engine 124, as "Spiders have 8 legs" and "Ants have 6 legs" (additional textual rewrites may be provided, such as those that include synonyms).

The identified entity attributes may be utilized by various components of knowledge system 102 to identify similarities/differences between the two or more entities in a segment of text. For instance, reading comprehension engine 128 may be configured to identify one or more similarities/ differences between entities, e.g., identified by entity identification engine 124 in one or more segments of text. Reading comprehension engine 128 may then provide some sort of indication of how the first and second entities are similar or different. This indication may come in various forms, such as an answer to the question, "how are the first and second entities different?," as a comparison of features of multiple products described in one or more product reviews, or as input to another component.

In some implementations, reading comprehension engine 128 may identify similarities and/or differences between entities in a segment of text using compare and/or contrast cues contained in the segment of text itself. For example, assume a text segment contains the following sentence: "While Bob combed his hair to appear presentable, Tom simply wore a hat." Reading comprehension engine 128 may determine, e.g., based on regular expressions, rules, heuristics, etc., that the word "While" signals that a contrast is being made between two entities. Reading comprehension engine 128 may then provide an indication of how Bob and Tom are different, e.g., "Bob combed his hair; Tom wore a hat." More details about reading comprehension engine 128 are discussed below.

Ranking engine 130 may use the indices 125, 127 and/or 129 to identify documents and other information responsive to a search query, for example, using conventional and/or other information retrieval techniques. Ranking engine 130 may calculate scores for the documents and other information identified as responsive to a search query, for example, using one or more ranking signals. Each ranking signal may provide information about the document or information itself, the relationship between the document or information and the search query, the relationship between the document or information and the user performing the search, and/or relationships between entities described in documents (e.g., similarities and/or differences between entities). Other components not depicted in FIG. 1 also may utilize similarities/ differences between entities, e.g., determined by reading comprehension engine 128, to perform various operations. Examples will be described with reference to FIG. 2.

With continued reference to FIG. 1, in another aspect, subject/action identification engine 132 may be configured to identify in a segment of text one or more subjects and associated actions (herein referred to as "subject-action pairs") that are described in the segment of text as being performed by the associated one or more subjects. Subject-action pairs may come in various forms. For example, a noun followed by a verb (e.g., "fish swims") may form a subject ("fish")-action ("swims") pair. Other, potentially more complex word patterns, such as verb-phrase patterns, may also contain or suggest the existence of subject-action pairs. For example, "have something," "be something," "be somehow," and/or "be like something" are word patterns that may be used as signals to identify subject-action pairs. In the sentence "Bob has four cats," the subject may be "Bob," and the action may be "has." In some implementations, the word pattern <NOUN "is/has been/will be/are/am" ADJECTIVE> may be a rule that is used to identify subject-action pairs (e.g., "Bob is happy," "Lucille is shaggy," "I am tall," etc.).

In some implementations, subject/action identification engine 132 may utilize annotated output generated by one or more text annotators (see FIGS. 2, 5) based on a segment of text to identify one or more subjects and associated actions. Various techniques may be utilized to determine which actions to associate with which subjects in a segment of text. In some implementations, subject/action identification engine 132 may utilize regular expressions, machine learning, rules-based approaches, heuristics, or other techniques to identify one or more subjects and associated actions in a segment of text.

In some implementations, subject/action identification engine 132 may utilize co-reference resolution to map a pronoun with a particular subject and, in turn, map an action performed by the pronoun to the given subject. For example, subject/action identification engine 132 may resolve "they" to "Doug and Maria" and associate the action "dance" with "Doug" and with "Maria" based on the following sentence in a segment of text: "Maria and Doug are happy, and they both dance."

Object completion is another technique that may be employed by subject/action identification engine 132 to associate actions with subjects. Assume a segment of text contains a sentence or phrase that directly describes a relationship between a first subject and a first action, but only indirectly describes a relationship between a second subject and a second action. Subject/action identification engine 132 may be configured to determine, and in some cases generate a textual rewrite that more directly describes, a relationship between the second subject and the second action. For example, assume a segment of text contains the sentence, "Bob swims daily, Tom does not." Subject/action identification engine 132 may employ object completion to generate a textual rewrite of the second portion of the sentence, which may read, "Tom does not swim daily." Subject-action pairs may be stored, e.g., by subject/action identification engine 132, in various forms and locations for utilization in determining subject-action performability. In some implementations, the associations may be stored, e.g., by subject/action identification engine 132, as index entries, a table, a graph, etc. In some implementations, the associations may be stored, e.g., by subject/action identification engine 132, as one or more textual rewrites that are generated from the segment of text.

Performability statistics engine 134 may be configured to analyze one or more corpora of documents, e.g., from one or more indexes 135, to determine statistics relating to reference subject-action pairs. These statistics may be used by other components, such as subject/action performability engine 136, to determine a likelihood that an action in a particular segment of text is performable by its associated subject. In some implementations, performability statistics engine 134 may identify a plurality of reference subjects and associated reference actions found in a corpus of textual documents. In various implementations, distributional statistics may be derived from reference subject-action pairs identified by performability statistics engine 134. Distribution statistics may be used to determine likelihoods that actions are performable by particular subjects. In some implementations, based on the plurality of reference subjects and actions, performability statistics engine 134 may determine a likelihood that one or more actions are performable by one or more classes of subjects.

In some implementations, performability statistics engine 134 may perform such analysis on the fly, e.g., contemporaneously with analysis of a particular segment of text. In some implementations, performability statistics engine 134 may perform such analysis prior to analysis of a particular segment of text. The results of such analysis may later by used by various downstream components, such as subject/action performability engine 136. In some implementations, performability statistics engine 134 may employ machine learning in which a classifier is trained, e.g., using supervised and/or semi-supervised learning with labeled documents.

The corpus of documents may be selected for analysis by performability statistics engine 134 based on how "performability" of actions by subjects is to be judged. For example, if one or more textual documents are to be analyzed for verisimilitude, then a corpus of "realistic" documents unlikely to contain personified subjects, such as news articles and/or non-fictional works, may be selected. In some implementations, a corpus of documents that contain below a predetermined threshold of personified entities may be selected. When multiple human reference subjects found in such a corpus are said to perform a particular action, it may be relatively likely that a human being may be capable of performing such an action. Alternatively, if one or more textual documents are to be analyzed to determine whether actions described therein are performable in a fantasy world by particular fantasy characters (or types of characters, e.g., "dragons," "zombies," "wizards," "robots," etc.), then a corpus of "fantasy" documents may be selected.

In various implementations, the distributional statistics derived from the reference subject-action pairs identified by performability statistics engine 134 may take various forms. For example, assume analysis of a non-fictional corpus of documents by performability statistics engine 134 reveals that a far greater number of "human" subjects perform a first action (or synonymous actions) than do "non-human" subjects. That first action (and in some cases one or more synonymous actions) may be designated as primarily or exclusively human. When the first action is described in a segment of text as being performed by a non-human subject, subject/action performability engine 136 may be prone to characterize that non-human subject as "personified."

As another example, assume analysis of the same non-fictional corpus of documents reveals that an approximately equal number of "human" and "non-human" subjects perform a second action (or synonymous actions). When the second action is described in a segment of text as being performed by a non-human subject, subject/action performability engine 136 may be unlikely to characterize that non-human subject as "personified" because the action is likely performable by a "non-human" (at least according to the corpus of documents analyzed).

As alluded to above, in some implementations, when a likelihood that a particular action is performable primarily or exclusively by a particular class of subjects is increased (e.g., by performability statistics engine 134), one or more likelihoods that one or more synonymous actions are also performable primarily or exclusively by the particular class of subjects may also increase. In some cases, the likelihoods for both the original action and the one or more synonymous actions may be increased equally and/or in proportion. In some cases, the likelihood for the one or more synonymous actions may be increased less than the likelihood for the original action, or not at all. For example, the actions "dance" and "prance" are synonymous. However, a non-human subject such as a horse may be deemed more likely capable of "prancing" than "dancing," particularly if a corpus of hard news and/or scientific nonfictional documents is analyzed by performability statistics engine 134. In such a situation, if a horse is described as "dancing," it may be deemed "personified," whereas if the horse is described as "prancing," it may not be deemed "personified."

The subject-action pairs identified by subject/action identification engine 132 may be analyzed, e.g., by subject/action performability engine 136, based in part on statistics provided by performability statistics engine 134, as well as other signals, to determine a likelihood that the action is performable by the subject or a class of subjects of which the subject is a member. Subject/action performability engine 136 may provide some sort of indication of the likelihood that an action of a subject-action pair is performable by the subject. This indication may come in various forms, such as an answer to the question, "Can the subject perform the purported action?", or as input to another component. In some implementations, particularly where it is determined that it is unlikely that a subject is capable of performing an associated action, the indication may include an indication that the subject-action pair is one that would exist only in "make believe." In some implementations, if a threshold number of subjects described in a segment of text are deemed "personified" (e.g., >50%, >%60, etc.), the entire segment of text may be deemed "make-believe."

Suppose a segment of text contains the sentence, "The dog danced excitedly upon seeing its owner." Subject/action identification engine 132 may identify the "dog" as a subject, and "danced" and "seeing" as associated actions. Performability statistics engine 134 may be trained on a corpus of non-fictional documents, e.g., news stories, scientific articles, etc. Subject/action performability engine 136 may determine, based on reference subject-action pairs and/or performability statistics provided by performability statistics engine 134, that a dog is highly likely to be capable of "seeing," but unlikely to be capable of "dancing." Subject/action performability engine 136 may provide an indication, e.g., to various downstream components, that the dog has been "personified," at least insofar as the dog is described in the segment of text as "dancing."

In addition to information from performability statistics engine 134, subject/action performability engine 136 may utilize other signals to determine subject-action performability. For example, in some implementations, subject/action performability engine 136 make take a designated class of the subject into account when determining a probability of whether the subject is or is not capable of performing a particular action. For instance, some annotators may provide annotated output that annotates subjects by class. Human beings may be annotated as "PERSON," but animals and other subjects may be classified differently, e.g., as "ANIMALS." Such classes may be taken into account when determining, for instance, whether a particular subject has been personified. If the subject was originally classified as a human, then it may be less likely that the subject has been personified than if the subject were originally classified as non-human.

Downstream components that may use output from subject/action performability engine 136 may come in various forms. Ranking engine 130 is one such example. Other components not depicted in FIG. 1 also may utilize subject-action performabilities, e.g., determined by subject/action performability engine 136, to perform various operations. Examples will be described with reference to FIG. 5.

Figure 2:
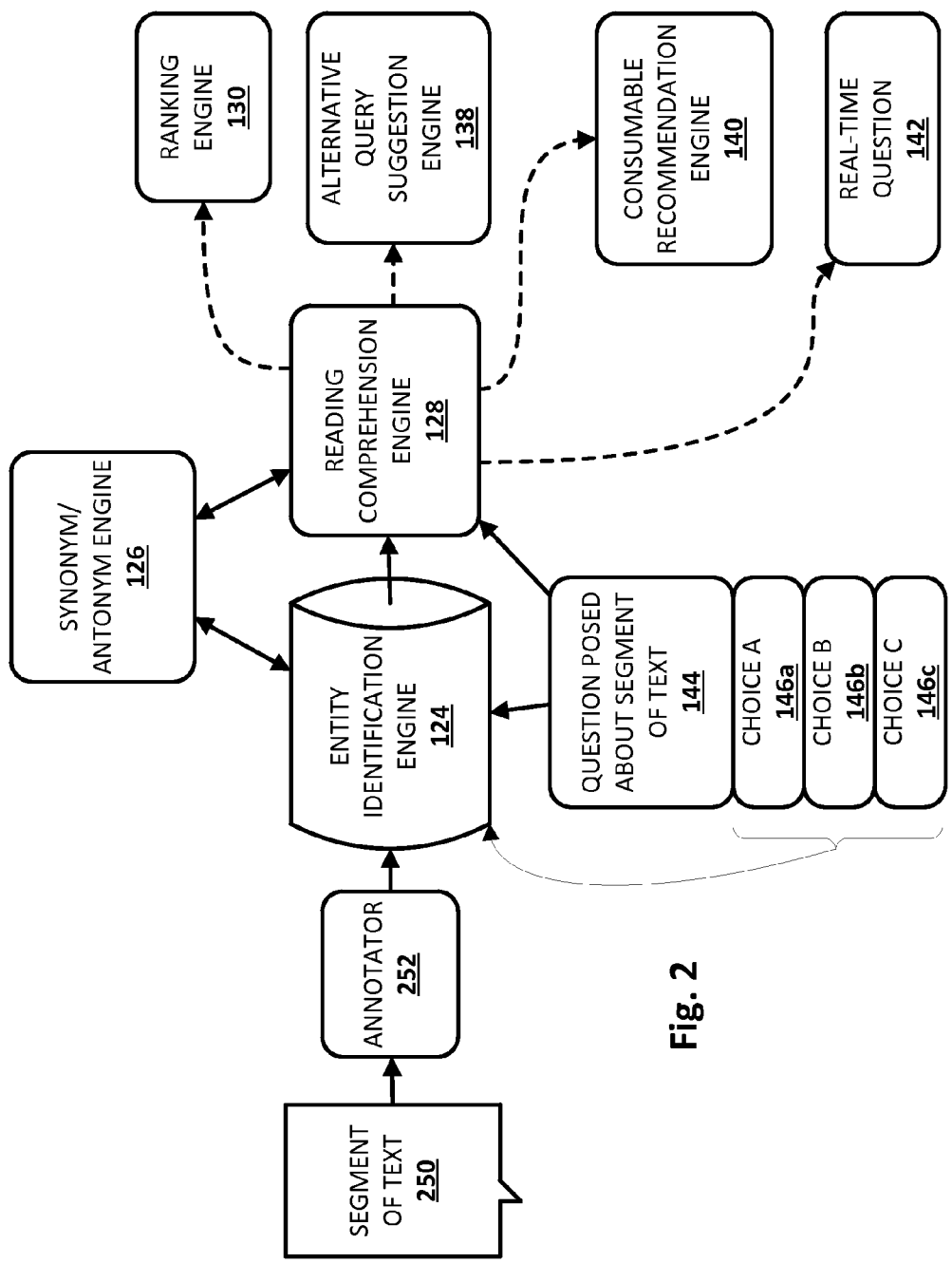
FIG. 2 illustrates one example of how a segment of text may be processed by various components configured with selected aspects of the present disclosure to determine similarities and/or differences between entities in the segment of text.

Turning back to the first aspect, FIG. 2 schematically depicts an example of how a segment of text 250 may be analyzed by various components configured with selected aspects of the present disclosure to determine similarities and/or differences between entities in segment of text 250. In some implementations, segment of text 250 may first be processed by one or more annotators 252. One or more annotators 252 may be configured to identify and annotate various types of grammatical information in segment of text 250. This grammatical information may include but is not limited to nouns, pronouns, parts of speech, verbs, adverbs, adjectives, tense, and so forth. The output of one or more annotators 252—e.g., annotated text—may be then processed by entity identification engine 124. In some implementations, one or more annotators 252 may be omitted, and entity identification engine 124 may analyze segment of text 250 directly, e.g., in unannotated form.

As noted above, entity identification engine 124 may employ various techniques (e.g., objection completion, co-reference resolution, etc.) to identify two or more entities and associated entity attributes. As indicated by the arrow between them, entity identification engine 124 may also consult synonym/antonym engine 126 to identify entity attributes.

Entity identification engine 124 may output various types of information. In some implementations, entity identification engine 124 may output segment of text 250 with entity and entity attribute annotations, e.g., in addition to any annotations provided by one or more annotators 252. As indicated by other arrows, entity identification engine 124 may identify entities for comparison/contrast based not only on segment of text 250, but also based on a question 144 posed about segment of text 250, as well as one or more answer choices 146*a-c* associated with question 144.

Output of entity identification engine 124 may be used by reading comprehension engine 128, in addition with a variety of other signals and/or sources of information, to determine similarities and/or differences between entities in segment of text 250. For example, and as indicated by the arrow between them, reading comprehension engine 128 may consult synonym/antonym engine 126 to determine whether an attribute of a first entity is synonymous or antonymous to an attribute of a second entity, and thus should be identified as a source of a similarity or difference between the first and second entities. Or, as noted above, reading comprehension engine 128 may utilize various compare/contrast signals in segment of text 250, such as "while," "but," "however," "on one hand . . . on the other hand," "similarly," "by contrast,"

"in contrast," "as was the cast with . . . ," "like," "unlike," and so forth, to determine similarities and/or differences between entities.

Not all entity attributes may be comparable to each other. For instance, it wouldn't make sense for reading comprehension engine 128 to compare a color of entity A's shirt to a size of entity B's shoes. Rather, in some implementations, reading comprehension engine 128 may compare entity attributes that share an attribute "class." For example, a color of entity A's shirt (e.g., attribute.class=shirt color) may be compared to a color of entity B's shirt. Whether entity attributes are associated with the same class may be determined from various sources. In some implementations, attributes may be classed together by virtue of those attributes being synonymous or antonymous to each other (e.g., as determined by synonym/antonym engine 126). In some implementations, attributes may be classed together based on data contained in a knowledge graph (e.g., in index 127). For example, "boots" and "sandals" may both be in the class "footwear," and may be comparable on various attributes, such as color, size, comfort, price, durability, waterproofness, etc.

Reading comprehension engine 128 may be configured to provide various indications of one or more similarities and/or differences between entities in segment of text 250. In some implementations, reading comprehension engine 128 may provide a summary of similar and/or dissimilar attributes between two or more entities with segment of text 250. For example, reading comprehension engine 128 may determine, based on product entities and associated attributes identified and/or annotated in one or more product descriptions, user reviews, or other similar texts, a list of product features for each product of a plurality of products. For example, if one or more reviews compares and contrasts multiple cameras, reading comprehension engine 128 may output a list of product features and an indication of what form, if any, each product includes that feature. In some implementations, reading comprehension engine 128 may provide the entity similarity/dissimilarity indications to various downstream components. Those downstream components may utilize the entity similarity/dissimilarity indications for various purposes.

For example, an alternative query suggestion engine 138 may use entity similarity/dissimilarity indications, as well as one or more other signals and/or other information (contextual cues related to a user of client device 106, such as GPS location, other sensor readings), to generate alternative query suggestions to provide to client device 106. For example, assume a user reads an article that compares and contrasts a plurality of beaches on various criteria (e.g., best waves, best weather, softest sand, clearest water, most sea life, best snorkeling, etc.). The user then types into her browser (e.g., 107) search field "best snorkeling beaches" Alternative query suggestion engine 138 may provide, based on comparisons and/or contrasts determined from the beach article (in which places may be entities), an alternative query suggestion that specifically includes the names of one or more beaches described in the article as being good for snorkeling, having clear water, lots of sea life, etc.

A consumable recommendation engine 140 may utilize entity similarity/dissimilarity indications to recommend items, e.g., songs, videos, restaurants, attractions, events, books, etc., for consumption by a user. For example, assume a user likes a first musician, and that an article is published comparing and contrasting the first musician to a second musician. Based on similarities between the first and second musicians drawn from the article, consumable recommendation engine 140 may recommend (or not recommend) a song by the second musician to the user for consumption.

As indicated at 142, one or more entity similarity/dissimilarity indications provided by reading comprehension engine 128 may be utilized to answer a question posed in real time about segment of text 250. For example, a user may type into a search field of browser 107, "How are A and B different?" Various systems, such as knowledge system 102, may utilize one or more indications obtained from reading comprehension engine 128 to attempt to answer such a question.

Real time question 142 and/or one or more predetermined questions 144 (e.g., as may be found on a reading comprehension exam) posed about segment of text 250 may themselves be analyzed using one or more techniques disclosed herein. For instance, and as indicated by the arrow in FIG. 2, entity identification engine 124 may identify one or more entities in a predetermined question 144 posed about segment of text 250, and may provide those entities (e.g., to the exclusion of other entities described in segment of text 250) to reading comprehension engine 128. In some implementations, reading comprehension engine 128 may limit its analysis of upstream data to those entities identified in predetermined question 144. In other implementations, reading comprehension engine 128 may analyze all entities mentioned in segment of text 250, but may provide indications of similarities and/or differences between only those entities identified in question 144 (or real time question 142).

Some questions 144 posed about segment of text 250 may include answer choices, e.g., 146a-c in FIG. 2, that may be selected, e.g., in a multiple choice test setting, as an answer to question 144. Similar to question 144, one or more answer choices 146a-c may also be analyzed using one or more disclosed techniques, e.g., to identify entities for comparison. In some implementations, statements made in answer choices may be "tested" against statements made in segment of text 250 to determine the veracity of those answer choices. In various implementations, reading comprehension engine 128 and/or entity identification engine 124 may employ object completion to generate textual rewrites of indirect descriptions of entity/attribute relationships contained in question 144 and/or answer choices 146.

Figure 3:
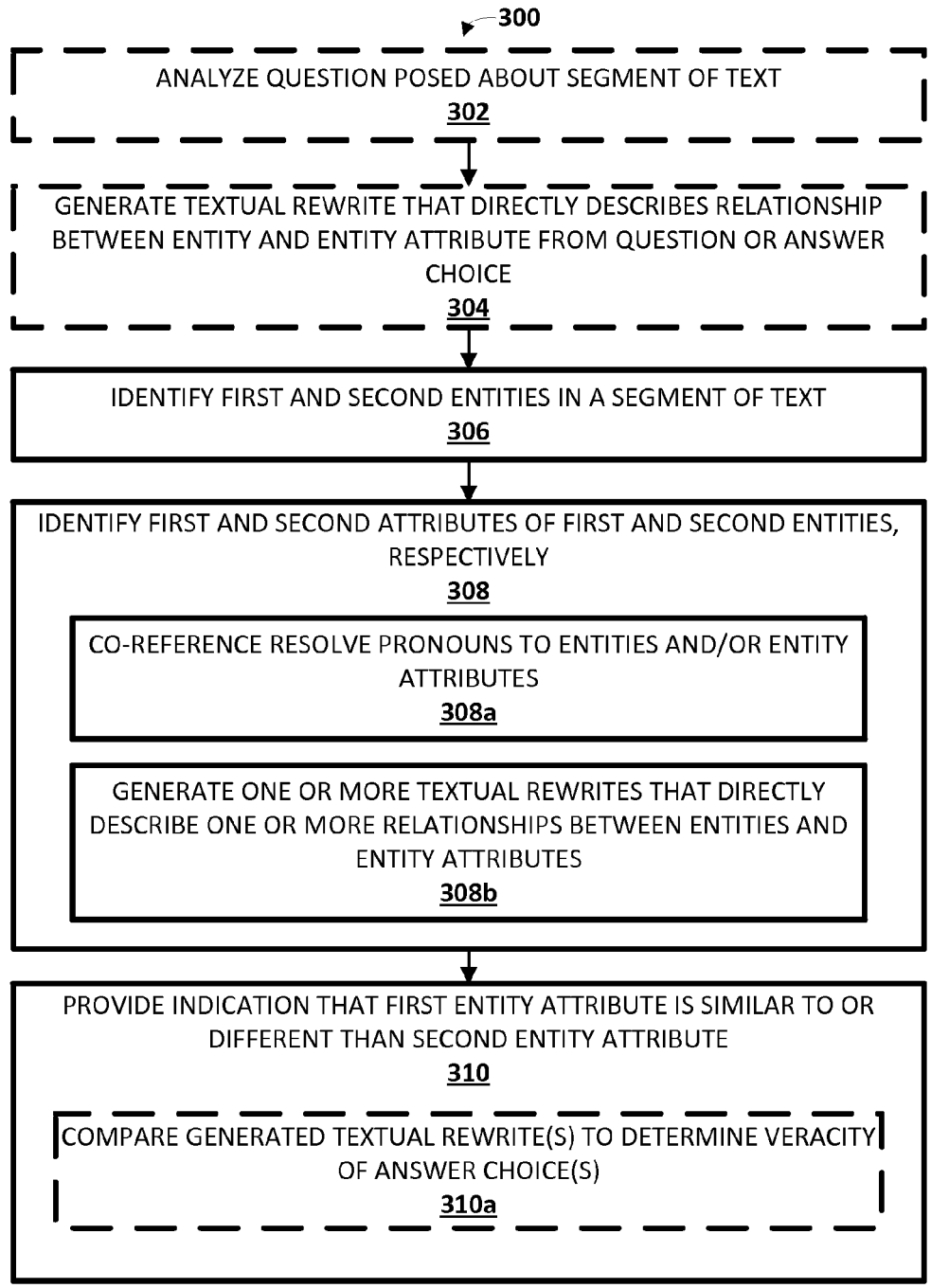
FIG. 3 is a flow chart illustrating an example method of determining similarities and/or differences between entities in segments of text.

Referring now to FIG. 3, an example method 300 of determining similarities and/or differences between entities in a segment of text is depicted. For convenience, the operations of the flow chart are described with reference to a system that performs the operations. This system may include various components of various computer systems. For instance, some operations may be performed at the client device 106, while other operations may be performed by one or more components of the knowledge system 102, such as entity identification engine 124, synonym/antonym engine 126, reading comprehension engine 128, and so forth. Moreover, while operations of method 300 are shown in a particular order, this is not meant to be limiting. One or more operations may be reordered, omitted or added.

At optional block 302, the system may analyze a question (e.g., 142, 144) posed about a segment of text to determine various information. For example, based on wording of the question (e.g., "how are A and B the same"), the system may identify two or more entities to compare (e.g., A and B), and/or may determine whether similarities or differences ("the same"=similarities) are to be determined between entities. Of course, it is not required that a question be posed about a segment of text in order for techniques disclosed herein to be employed. For instance, in some implementations, one or more segments of text may be annotated (or further annotated) with information about similarities and/or differences between entities described therein to aid downstream components. For instance, various downstream components such as ranking engine 130, alternative query suggestion engine 138, or consumable recommendation engine 140 may use these similarity/difference annotations for various purposes, such as ranking search results, suggesting alternative query suggestions, recommending consumables, and so forth. Thus, block 302 is shown in dashed lines to indicate that it is optional.

At similarly optional block 304, the system may generate, from a question 144 or one or more answer choices 146, one or more textual rewrites that directly describe one or more relationships between entities and associated entity attributes. As noted above, some questions or answer choices may describe a relationship between an entity and an entity attribute indirectly. For example, an answer choice may read, "Bob has hair, Tom does not." The system may generate a textual rewrite, "Tom does not have hair," that may more easily be compared to similar statements contained in the segment of text (or textual rewrites thereof).

At block 306, the system may identify two or more entities in the segment of text. If a question posed about the segment of text identified particular entities (as may be determined at block 302), then those particular entities may be identified in the segment of text. In other instances, entities mentioned in the segment of text may be identified less discriminately.

At block 308, the system may identify entity attributes of the entities identified at block 306. As noted above, various techniques may be employed to associate entity attributes with entities. For example, at block 308a, pronouns (e.g., "he," "she," "him," "her," etc.) may be co-reference resolved to entities and/or entity attributes. At block 308b, and similar to block 304, the system may generate one or more textual rewrites that more directly describe relationships between entities and entity attributes that are contained in the segment of text.

At block 310, the system may provide various entity or entity attribute similarity/dissimilarity indications to various components. For example, at optional block 310a, the system may compare textual rewrites of portions of answer choices generated at block 304 to textual rewrites of portions of the segment of text, e.g., generated at block 308b, to determine a veracity of one or more answer choices. An example of this is shown in FIG. 4.

In FIG. 4, a segment of text 450 contains the following text:
Bob and Tom are both male. By contrast, Mary is not. Bob has gray hair, Tom does not. Mary has blond hair, no car and a condo. Tom has a Buick and lives in a house. Bob lives with Tom and eschews a car for public transportation.

Various techniques described herein may be utilized to analyze segment of text 450 and/or questions 444 posed about segment of text 450, in order to determine similarities and/or differences between various entities described in segment of text 450.

As noted above, entity identification engine 124 may utilize various techniques, such as regular expressions or rule-based pattern matching techniques, to identify entities and/or entity attributes. For instance, suppose sentences are organized into trees using rules-based pattern matching. Suppose further that the following question (not depicted in FIG. 4) is posed about segment of text 450: "What does Bob have that Tom does not?" A rule may be created that provides that if there is a root verb (e.g., "have") that has a named subject noun as a child (e.g., "Bob"), and there is a comparison (e.g., "does") of that root verb that has another named subject as a child (e.g., "Tom"), and the comparison is negated (e.g., "not") then the two subjects ("Bob" and "Tom") should be identified as entities.

The third sentence of segment of text 450, which reads, "Bob has gray hair, Tom does not," directly describes a relationship between the first entity (Bob) and the first entity attribute (hair). However, this sentence only indirectly describes a relationship between the second entity (Tom) and the second entity attribute (hair). In various implementations, a textual rewrite that directly describes a relationship between the second entity and the second entity attribute may be generated, e.g., by entity identification engine 124, which may read "Tom does not have gray hair." In some implementations, another textual rewrite may be generated for the first entity relationship, and may read, "Bob has gray hair."

These two textual rewrites may be collected, e.g., by entity identification engine 124, along with other similar textual rewrites about entity/entity attribute relationships in segment of text 450, and stored in various locations. These textual rewrites and/or the entity/entity attribute relationships they represent may later be compared, e.g., by reading comprehension engine 128, to other similar textual rewrites and/or entity/entity attribute relationships, e.g., to determine a veracity of one or more answer choices. Collecting and storing textual rewrites (or more general descriptions of entity/entity attributes) in this manner may enable comparison of entities/entity attributes mentioned in entirely separate portions of a segment of text.

As another illustrative example, below segment of text 450 is a reading comprehension question 444, which asks, "Which of the following choices about Bob and Tom is true?," and lists four answer choices 446a-d. Object completion or other similar techniques may be performed, e.g., by entity identification engine 124, to generate the following textural rewrites for answer choice 446a: "Bob has gray hair," and "Tom has gray hair." Based on the textural rewrites generated for the third sentence of segment of text 450 ("Bob has gray hair." Tom does not have gray hair"), it may be determined, e.g., by reading comprehension engine 128, that choice A is false because Tom does not have gray hair.

Similar analysis may be performed, e.g., by entity identification engine 124 and/or reading comprehension engine 128, on the remainder of textual segment 450 and on the other answer choices 446b-d. For example, answer choice 446b may generate the textual rewrites, "Bob lives in a Condo," and "Tom does not live in a Condo." Processing of the fifth sentence of segment of text 450 ("Tom has a Buick and lives in a house") may yield the textual rewrites, "Tom has a Buick" and "Tom lives in a house." By comparing these textual rewrites, it may be determined, e.g., by reading comprehension engine 128, that the second portion of answer choice 446b ("Tom does not live in a Condo") is true. However, the sixth sentence of segment of text 450 reveals that "Bob lives with Tom." The word "with" may be identified, e.g., by reading comprehension engine 128, as a compare signal, and from that may generate the textual rewrite, "Bob lives in a house." It may now be determined, e.g., by reading comprehension engine 128, that the first part of answer choice 446b ("Bob lives in a condo") is false, and therefore, answer choice 446b cannot be true. Ultimately, answer choice 446d may be determined to be correct because both statements "Bob lives in a house" and "Tom does not have gray hair" are demonstratively true based on segment of text 450.

Referring back to FIG. 2, assume question 144 about segment of text 250 reads, "How is the red dog different than the blue dog?" If only one-word entities were extracted from this question, then two instances of "dog" would result. To address this, in various implementations, a rule could be generated to provide that, "if two entities being contrasted are the same, include modifying possessives or adjectives as part of the entity string that is identified." This rule would result in "red dog" and "blue dog" both being identified as entities.

In some implementations, information from two or more of segment of text 250, a question (e.g., 142, 144) posed about segment of text 250, and one or more answer choices 146*a-c* may be used to identify entities where, for instance, segment of text 250 or posed question 142/144 individually would not be sufficient. For instance, assume that segment of text 250 describes two cats, Salt and Pepper, and that question 144 reads, "What is one way the cats are different?," with answer choices "Salt is smarter," "Pepper is shinier," "Pepper eats dinner alone," and "Pepper takes care of the skunk." In some implementations, "the cats" may be identified from the question as the two entities being compared or contrasted. Heuristics may then be used, e.g., by entity identification engine 124, to identify the entities comprising "the cats." For instance, the number of entity mentions in the answer choices may be counted. Those mentioned entities acting as subjects and those appearing alone in an answer choice may be given extra weight. The two entities that have the most mentions may be identified, e.g., by entity identification engine 124, as the entities ("the cats") to be compared and/or contrasted (in this example, Salt and Pepper).

A similar heuristic may be used, e.g., by entity identification engine 124, when neither the question nor the answer choices are sufficient individually to identify entities. Assume the question," Both kinds of skiers _____," with possible choices, "carry two poles," "can go barefoot," "ski behind boats," and "can do fancy tricks." While it may be apparent to a reader that the entities being referred to include snow skiers and water skiers, this may be difficult for entity identification engine 124 to determine from these question/answer choices alone, as the words "snow" and "water" are not mentioned. In some implementations, a corresponding segment of text may be analyzed to seek out mentions to "skiers." Then, possessive modifiers and/or modifying adjectives of these mentions may be used, for instance, to split the "skier" mentions into two clusters: "snow skiers" and "water skiers." Assuming these clusters are sufficiently clear (e.g., there are not other similarly-sized clusters of different types of skiers), then it may be determined, e.g., entity identification engine 124, that the two entities referred to in the question are snow skiers and water skiers.

In various implementations, one or more techniques may be employed, e.g., by entity identification engine 124 and/or reading comprehension engine 128, to determine how strongly a particular entity/entity relationship determined from an answer choice matches one determined from a segment of text. This may be used, for instance, to choose the "best" of multiple answer choices that may not necessarily be incorrect. In some such implementations, each answer choice may be assigned a weighted score based on various signals, including but not limited to compare and/or contrast signals contained in the segment of text. The answer choice with the highest (or otherwise most satisfactory) score may be selected.

For instance, suppose an answer choice states, "Tom plays soccer, but Bob plays basketball," and that a sentence in a segment of text reads, "However, Bob plays basketball." The portion of the segment sentence "Bob plays basketball" may already match fairly strongly to the second part of the answer choice ("Bob plays basketball"). But, the fact that the word "However" occurs immediately before the statement, "Bob plays basketball" in the segment of text may be an even stronger signal the fact that Bob plays basketball is being contrasted with something else. A rule may be implemented, e.g., by entity identification engine 124, that provides, "if there is a match between an entity statement and a sentence, and the entity is the named subject of the root verb, and there is an adverb modifier that is a child of the root verb that is a synonym of "however" (e.g., "but," "on the other hand," etc.), then the match may be weighted particularly heavily. Other similar rules may be implemented to take advantage of other compare/contrast signals that may be contained within the segment of text or elsewhere. In various implementations, other compare/contrast signals (e.g., "both," "each," "more than," "less than," etc.) in a segment of text may be detected and utilized in a similar manner.

Figure 5:
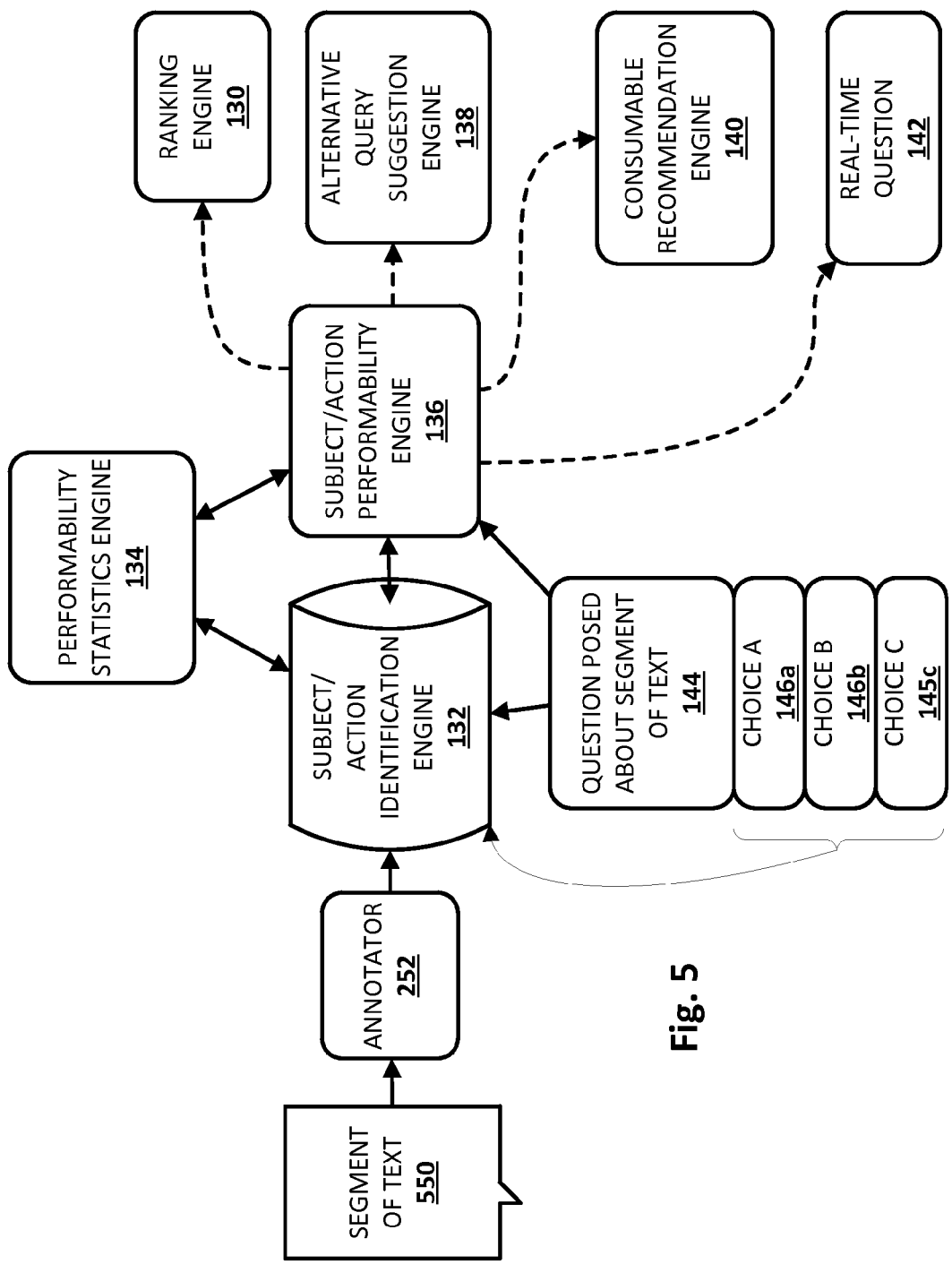
FIG. 5 illustrates one example of how a segment of text may be processed by various components configured with selected aspects of the present disclosure to determine likelihoods that actions are performable by associated subjects.

Returning to the second aspect, FIG. 5 schematically depicts an example of how a segment of text 250 may be analyzed by various components configured with selected aspects of the present disclosure to determine subject-action performabilities associated with subject-action pairs. In some implementations, segment of text 250 may first be processed by one or more annotators 252. One or more annotators 252 may operate as described above with reference to FIG. 2. The output of one or more annotators 252—e.g., annotated text—may be processed by subject/action identification engine 132. In some implementations, one or more annotators 252 may be omitted, and subject/action identification engine 132 may analyze segment of text 250 directly, e.g., in unannotated form.

As noted above, subject/action identification engine 132 may employ various techniques (e.g., objection completion, co-reference resolution, etc.) to identify one or more subject-action pairs mentioned in segment of text 250. Subject/action identification engine 132 may output various types of information. In some implementations, subject/action identification engine 132 may output segment of text 250 with subject-action pair annotations, e.g., in addition to any annotations provided by one or more annotators 252. As will be explained further below, subject/action identification engine 132 may identify subject-action pairs based not only on segment of text 250, but also based on questions posed about segment of text 250, as well as one or more answer choices associated with a question posed about segment of text 250.

Subject/action performability engine 136 may use output of subject/action identification engine 132, as well as reference subject-action pairs and/or statistics from performability statistics engine 134, to determine subject-action pair performabilities of one or more subject-action pairs identified in segment of text 250. Subject/action performability engine 136 may output various types of data. In some implementations, subject/action performability engine 136 may provide as output a list or summary of subject-action pairs, as well as associated subject-action performabilities. In some implementations, subject/action performability engine 136 may provide as output one or more probabilities (e.g., in the range [0,1]) that one or more subjects are capable of performing one or more associated actions.

In some implementations, subject/action performability engine 136 may provide as output segment of text 250 with further annotations regarding subject-pair performabilities. For instance, subject/action performability engine 136 may annotate a particular subject as "personified" if it is deemed unlikely, e.g., based on statistics from performability statistics engine 134, that the subject is capable of performing an associated action. In some implementations, this type of annotation may be used to improve co-reference resolution of "personified subjects" within segment of text 250.

For example, in some implementations, subject/action performability engine 136 may annotate a "personified subject" in segment of text 250, and then pass newly annotated segment of text 250 back to an upstream component such as subject/action identification engine 132 or one or more annotators 252. Subject/action identification engine 132 and/or one or more annotators 252 may then perform additional processing to accurately associate a gendered pronoun (e.g., "he" or "she") of the document to the personified subject. Subject/action identification engine 132 and/or one or more annotators 252 may then pass its newly updated output back to subject/action performability engine 136 and/or to other downstream components. In some implementations, subject/action performability engine 136 may use one or more annotations of personified subjects in segment of text 250 to identify a portion of segment of text 250, or even the entirety of segment of text 250, as "make-believe."

Various downstream components may utilize output provided by subject/action performability engine 136 for various purposes. For example, alternative query suggestion engine 138 may use subject-action performability indications, as well as one or more other signals and/or other information (contextual cues related to a user of client device 106, such as GPS location, other sensor readings, etc.), to generate alternative query suggestions to provide to client device 106. Assume a user operates a browser 107 executing on client device 106 to search for "dog dancing video." Subject/action performability engine 136 may provide alternative query suggestion engine 138 with an indication that, in fact, a dog is unlikely to "dance" as that is an action typically associated with humans. Alternative query suggestion engine 138 may then suggest an alternative query suggestion that includes an action more likely performable by a "dog," such as "hopping." Such an alternative and more plausible action may be determined by alternative query suggestion engine 138 (e.g., by consulting with a synonym/antonym engine or service), or may be suggested to alternative query suggestion engine 138 by subject/action performability engine 136.

Consumable recommendation engine 140 is another downstream component that may utilize action-pair performability indications, e.g., to recommend items (e.g., songs, videos, restaurants, attractions, events, books, etc.) for consumption by a user. For example, assume a user generally likes fantasy books. Performability statistics engine 134 may use fantasy books the user has read using client device 106 (e.g., as an e-Reader) as a corpus of documents, e.g., for training a machine learning classifier. Based at least in part on reference subject-action pairs and/or statistics from performability statistics engine 134, subject/action performability engine 136 may analyze performabilities of subject-action pairs found in one or more books that are candidates to be recommended to the user for consumption. Subject/action performability engine 136 may provide to consumable recommendation engine 140 one or more indications of its findings. Consumable recommendation engine 140 may take those indications into consideration when recommending a next book for consumption. For instance, if subject-action pairs in one candidate book have performabilities that are more similar to those identified from the user's past reading than other candidates, consumable recommendation engine 140 may be more likely to recommend the one book to the user for consumption.

As indicated at 142, one or more subject-action performability indications provided by subject/action performability engine 136 may be utilized to answer a question posed in real time about segment of text 250. For example, a user may type into a search field of browser 107, "Is Rygar real or make-believe?" Various systems, such as knowledge system 102, may utilize one or more indications obtained from subject/action performability engine 136 to attempt to answer such a question. For example, annotator 252 and/or subject/action identification engine 132 may determine from segment of text 250 (e.g., using objection completion, co-reference resolution, etc.) that Rygar is a horse, and that Rygar is described as performing the action, "singing." Subject/action performability engine 136 may determine, e.g., based on statistics determined by performability statistics engine 134 using a corpus of non-fiction documents, that horses are unlikely to be able to "sing." Subject/action performability engine 136 may provide an indication of such, e.g., to knowledge system 102, which in turn may answer question 142, "make believe."

Real time question 142 and/or one or more predetermined questions 144 (e.g., as may be found on a reading comprehension exam) posed about segment of text 250 may themselves be analyzed using one or more techniques disclosed herein. For instance, and as indicated by the arrow in FIG. 5, subject/action identification engine 132 may identify one or more subject-action pairs and/or a class against which a subject is to be compared in a predetermined question 144 posed about segment of text 250. Subject/action identification engine 132 may provide those subject-action pairs (e.g., to the exclusion of other subject-action pairs described in segment of text 250) and/or class to subject/action performability engine 136. In some implementations, subject/action performability engine 136 may limit its analysis of upstream data to those subject-action pairs and/or the class identified in predetermined question 144. In other implementations, subject/action performability engine 136 may analyze all subject-action pairs mentioned in segment of text 250, but may provide indications of similarities and/or differences between only those identified in question 144 (or real time question 142).

Some questions 144 posed about segment of text 250 may include answer choices, e.g., 146a-c in FIG. 5, that may be selected, e.g., in a multiple choice test setting, as an answer to question 144. Similar to question 144, one or more answer choices 146a-c may also be analyzed using one or more disclosed techniques, e.g., to identify subject-action pairs for performability. In some implementations, statements made in answer choices may be "tested" against statements made in segment of text 250 to determine the veracity of those answer choices. In various implementations, subject/action performability engine 136 and/or subject/action identification engine 132 may employ object completion to generate textual rewrites of indirect descriptions of subject-action relationships contained in question 144 and/or answer choices 146.

Figure 6:
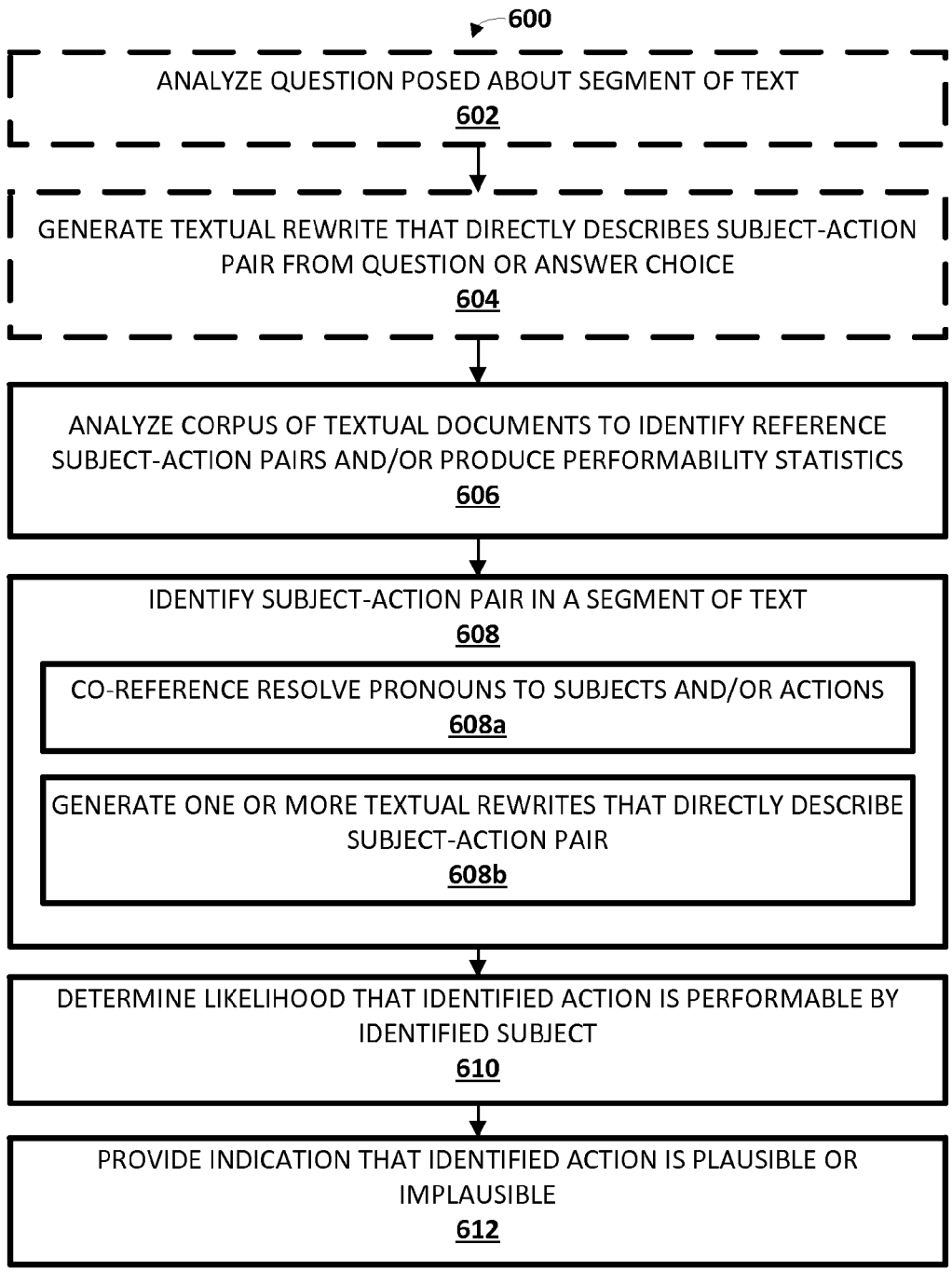
FIG. 6 is a flow chart illustrating an example method of determining a likelihood that an action is performable by an associated subject in a segment of text.

Referring now to FIG. 6, an example method 600 of determining action-pair performabilities is depicted. For convenience, the operations of the flow chart are described with reference to a system that performs the operations. This system may include various components of various computer systems. For instance, some operations may be performed at the client device 106, while other operations may be performed by one or more components of the knowledge system 102, such as subject/action identification engine 132, performability statistics engine 134, subject/action performability engine 136, and so forth. Moreover, while operations of method 600 are shown in a particular order, this is not meant to be limiting. One or more operations may be reordered, omitted or added.

At optional block 602, the system may analyze a question (e.g., 138, 140) posed about a segment of text to determine various information. For example, based on wording of the question (e.g., "Is A real or make-believe"), the system may identify a particular subject ("A") and may analyze an action purportedly performed by that subject to determine performability. Of course, it is not required that a question be posed about a segment of text in order for techniques disclosed herein to be employed. Thus, block 602 is shown in dashed lines to indicate that it is optional.

At block 604 (also optional), the system may generate, from a question 142, 144 or one or more answer choices 146, one or more textual rewrites that directly describe one or more subject-action pairs. As noted above, some questions or answer choices may describe a relationship between an action and associated subject indirectly. For example, an answer choice may read, "Bob has gills, Tom does not." The system may generate a textual rewrite, "Tom does not have gills," that may more easily be analyzed for performability (e.g., whether Tom is capable of "having" gills).

At block 606, the system may analyze a corpus of textual documents to identify reference subject-action pairs and/or to produce performability statistics. As noted above, the type of documents analyzed may influence how action-pair performability is determined. For instance, a classifier trained on a corpus of non-fictional documents (e.g., news articles, scientific journals, etc.) may be suitable to identify subjects in segments of text that have been personified. A classifier trained on a corpus of fictional documents set in a particular fantasy world may be suitable to determine whether subjects in segments of text adhere to rules of that fantasy world (e.g., wizards are human, elves are good, ores are evil, dragons breathe fire and talk, etc.). As mentioned previously, the analysis of block 606 may be performed contemporaneously with, or at a different time than, other operations of method 600.

At block 608, the system may identify one or more subject-action pairs in the segment of text. If a question (e.g., 142, 144) posed about the segment of text identified particular subjects (as may be determined at block 602), then those particular subjects may be identified in the segment of text, e.g., to the exclusion of others. In other instances, subjects mentioned in the segment of text may be identified less discriminately.

As noted above, various techniques may be employed to associate actions with subjects. For example, at block 608*a*, pronouns (e.g., "he," "she," "him," "her," etc.) may be co-reference resolved to subjects and/or associated actions. At block 608*b*, and similar to block 604, the system may generate one or more textual rewrites that more directly describe subject-action pairs that are contained in the segment of text.

At block 610, the system may determine one or more likelihoods that an identified action is performable by a subject described in a segment in text as performing the action. The system may perform various actions using the one or more determined likelihoods. For example, at block 612, the system may provide an indication that an action purported to be performed by a subject is plausible or implausible. If the subject is non-human and the action is human-centric, this may include providing an indication that the subject has been personified.

As a further example, assume the following segment of text.

Bob sings, dances and jumps. When Bob's dog Emmitt sees Bob dance, Emmitt gets excited and joins him.

Various techniques described herein may be utilized to analyze this segment of text and/or questions posed about this segment of text, in order to determine performabilities described in the segment of text.

As noted above, subject/action identification engine 132 may utilize various techniques, such as regular expressions or rule-based pattern matching techniques, to identify subjects and/or associated actions. For instance, two subjects, Bob and Emmitt, may be identified, e.g., by subject/action identification engine 132. In some implementations, an upstream annotator (e.g., 252) may have classified and/or annotated Bob as a "human" and Emmitt as a "non-human" or "dog," though this is not required.

Various portions of segment of this segment of text may be rewritten, e.g., by subject/action identification engine 132, as textual rewrites. For instance, the system may rewrite the first sentence of segment of text into the following textual rewrites: "Bob sings"; "Bob dances"; "Bob jumps." Similarly, the system may generate the following textual rewrites from the second sentence: "Emmitt sees," "Emmitt gets excited"; "Emmitt sings"; "Emmitt dances"; and "Emmitt jumps" (the last three subject-action pairs may be deduced, e.g., by subject/action identification engine 132, using various techniques, such as pronoun resolution, rules, etc.).

Once subject action pairs are identified, then performabilities associated therewith may be determined, e.g., by subject/action performability engine 136. For instance, as a human, Bob may be deemed likely capable of performing his associated actions of singing, dancing and jumping. Subject/action performability engine 136 may provide an indication as such. By contrast, Emmitt, as a dog (e.g., as designated by an upstream annotator), may be deemed unlikely capable of performing at least some of his associated actions, particularly singing and dancing. Subject/action performability engine 136 may provide an indication that it is implausible that Emmitt could sing or dance, and thus to the extent Emmitt is being described as doing so, Emmitt has been personified.

Figure 7:
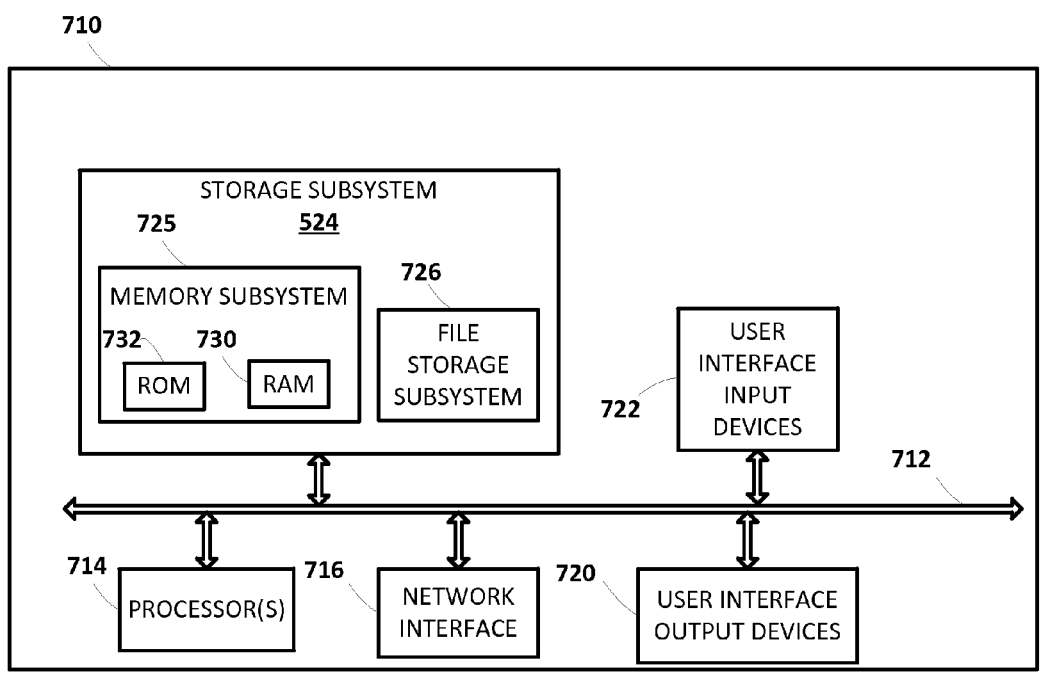
FIG. 7 illustrates an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices.

In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of methods 300 and/or 600, as well as one or more of the operations performed by indexing engine 120, information engine 122, entity identification engine 124, synonym/antonym engine 126, reading comprehension engine 128, ranking engine 130, subject/action identification engine 132, performability statistics engine 134, subject/action performability engine 136, alternative query suggestion engine 138, consumable recommendation engine 140, and so forth.

These software modules are generally executed by processor 714 alone or in combination with other processors. Memory 725 used in the storage subsystem can include a number of memories including a main random access memory (RAM) 730 for storage of instructions and data during program execution and a read only memory (ROM) 732 in which fixed instructions are stored. A file storage subsystem 724 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 724 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
identifying, by a computing system based at least in part on a segment of text, a first entity and a second entity that is distinct from the first entity;
determining, by the computing system based at least in part on the segment of text, that a first entity attribute associated with the first entity in the segment of text and a second entity attribute associated with the second entity in the segment of text share an attribute class;
in response to the determining, providing, by the computing system, an indication that, in the segment of text, the first entity attribute is either similar to or different than the second entity attribute; and
generating, by the computing system based on an answer choice that directly describes a relationship between the first entity and the first entity attribute and indirectly describes a relationship between the second entity and the second entity attribute, a textual rewrite that directly describes a relationship between the second entity and the second entity attribute.

2. The computer-implemented method of claim 1, further comprising comparing the textual rewrite to textual rewrites generated based on the segment of text to determine a veracity of the answer choice.

3. The computer-implemented method of claim 1, wherein the identifying the first and second entities is based on a question posed about the segment of text.

4. The computer-implemented method of claim 1, further comprising opting to provide either the indication that the first entity attribute is similar to the second entity attribute or different than the second entity attribute based on a type of question posed about the segment of text.

5. The computer-implemented method of claim 1, further comprising opting to provide either the indication that the first entity attribute is similar to the second entity attribute or different than the second entity attribute based on one or more compare or contrast signals contained in a question posed about the segment of text.

6. The computer-implemented method of claim 1, wherein identifying the first entity attribute of the first entity includes identifying a pronoun associated with the first entity attribute and co-reference resolving the first entity with the pronoun.

7. The computer-implemented method of claim 1, wherein the providing the indication that the first entity attribute is either similar to or different than the second entity is based on one or more words that signify a comparison or contrast to be made between two components.

8. The computer-implemented method of claim 1, wherein the providing the indication that the first entity attribute is either similar to or different than the second entity attribute comprises providing an indication that the first entity is similar to or different than the second entity based on a similarity or difference, respectively, between the first entity attribute and the second entity attribute.

9. The computer-implemented method of claim 1, further comprising:
receiving a question that includes information, the information including the first entity and the second entity;
matching the information to the first entity and the second entity; and
wherein the providing the indication that the first entity attribute is either similar to or different than the second entity attribute is in response to the matching.

10. The computer-implemented method of claim 1, wherein the first and second entities are first and second products, the first and second entity attributes are first and second product attributes, and the method further comprises providing a summary of product features of the first and second products, the summary including an indication of the first and second product features.

11. A computer-implemented method, comprising:
identifying, by a computing system based at least in part on a segment of text a first entity and a second entity that is distinct from the first entity;
determining, based on a portion of the segment of text that directly describes a relationship between the first entity and a first entity attribute of the first entity and indirectly describes a relationship between the second entity and a second entity attribute of the second entity, the second entity attribute;
determining, by the computing system based at least in part on the segment of text, that the first entity attribute associated with the first entity in the segment of text and the second entity attribute associated with the second entity in the segment of text share an attribute class;
in response to the determining that the first entity attribute and the second entity attribute share an attribute class, providing, by the computing system, an indication that, in the segment of text, the first entity attribute is either similar to or different than the second entity attribute; and
generating a textual rewrite that directly describes a relationship between the second entity and the second entity attribute.

12. The computer-implemented method of claim 11, wherein providing the indication that the first entity attribute is either similar to or different than the second entity attribute comprises providing the textual rewrite.

13. A system including memory and one or more processors operable to execute instructions stored in the memory, the memory comprising instructions to:
identify, in a segment of text, a subject and an action performed by the subject;
determine a likelihood that the action is performable by a class of subjects with which the subject is associated, the likelihood based at least in part on a plurality of reference subjects and associated reference actions found in a corpus of textual documents; and
provide an indication of the likelihood.

14. The system of claim 13, wherein the system further comprises instructions to provide an indication that performance of the action by the subject is plausible or implausible based on the likelihood.

15. The system of claim 13, wherein the subject is a non-human subject, and the system further comprises instructions to provide an indication that the subject has been personified in the segment of text.

16. The system of claim 13, wherein the identifying comprises identifying the subject and action based at least in part on annotations associated with the segment of text.

17. The system of claim 13, wherein the system further comprises instructions to determine the likelihood based on a question posed about the segment of text.

18. The system of claim 13, wherein the system further comprises instructions to determine the likelihood based at least in part statistics derived from the plurality of reference subjects and associated reference actions found in the corpus of textual documents.

19. The system of claim 18, wherein the system further comprises instructions to restrict the corpus to a textual documents that contain below a predetermined threshold of personified entities.

20. A non-transitory computer-readable medium comprising instructions that, in response to execution of the instructions by a computing system, cause the computing system to perform operations comprising:
identifying, based at least in part on a segment of text, a first entity and a second entity that is distinct from the first entity;
determining, based at least in part on the segment of text, that a first entity attribute associated with the first entity in the segment of text and a second entity attribute associated with the second entity in the segment of text share an attribute class;
in response to the determining, providing an indication that, in the segment of text, the first entity attribute is either similar to or different than the second entity attribute;
identifying, in the segment of text, a subject and an action performed by the subject;
determining a likelihood that the action is performable by a class of subjects with which the subject is associated, the likelihood based at least in part on a plurality of reference subjects and associated reference actions found in a corpus of textual documents; and
providing an indication of the likelihood.

* * * * *